United States Patent
Sakakibara et al.

(10) Patent No.: US 11,027,401 B2
(45) Date of Patent: Jun. 8, 2021

(54) SOCKET

(71) Applicant: HONDA MOTOR CO., LTD., Tokyo (JP)

(72) Inventors: Toshitsugu Sakakibara, Wako (JP); Kazuhiro Tsuzaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/801,903

(22) Filed: Feb. 26, 2020

(65) Prior Publication Data

US 2020/0276652 A1 Sep. 3, 2020

(30) Foreign Application Priority Data

Mar. 1, 2019 (JP) .............................. JP2019-037187

(51) Int. Cl.
*B25B 23/00* (2006.01)
*B23B 31/00* (2006.01)

(52) U.S. Cl.
CPC ........ *B25B 23/0035* (2013.01); *B23B 31/008* (2013.01); *Y10S 279/903* (2013.01); *Y10T 279/20* (2015.01)

(58) Field of Classification Search
CPC .............. B25B 23/0035; B23B 31/008; Y10S 279/903
See application file for complete search history.

(56) References Cited

U.S. PATENT DOCUMENTS

| | | | | |
|---|---|---|---|---|
| 4,002,348 A | * | 1/1977 | Johnson | B23B 31/086 279/75 |
| 5,464,229 A | * | 11/1995 | Salpaka | B23B 31/1071 279/30 |
| 10,556,327 B2 | * | 2/2020 | Lin | F16H 31/002 |
| 2018/0056488 A1 | * | 3/2018 | Dein | B25B 13/462 |

FOREIGN PATENT DOCUMENTS

| | | |
|---|---|---|
| CN | 204108904 U | 1/2015 |
| JP | 2017-159420 A | 9/2017 |

OTHER PUBLICATIONS

Office Action received in corresponding CN application No. 202010135194.1 dated Mar. 26, 2021 with English translation (13 pages).

* cited by examiner

*Primary Examiner* — Eric A. Gates
(74) *Attorney, Agent, or Firm* — Rankin, Hill & Clark LLP

(57) ABSTRACT

Provided is a socket which includes: an outer socket, an inner socket arranged to face an inner periphery of the outer socket, a coil spring (urging member) configured to urge the inner socket toward one end of the outer socket, and a lock/unlock mechanism configured to restrict the inner socket displaced toward the other end of the outer socket against an urging force of the coil spring from being rotated with respect to the outer socket.

7 Claims, 7 Drawing Sheets

UNLOCKED STATE

LOCKED STATE

CLOCKWISE

CONTERCLOCKWISE

SOCKET

CROSS-REFERENCE TO RELATED APPLICATION

The present application claims the benefit of priority to Japanese Patent Application No. 2019-037187 filed on Mar. 1, 2019, the disclosures of all of which are hereby incorporated by reference in their entireties.

TECHNICAL FIELD

The present invention relates to a socket to be attached to a rotating tool.

BACKGROUND OF THE INVENTION

As a socket for a rotating tool to be used to fasten a fastener such as a bolt or nut, there has been a bottomed socket having a substantially cylindrical shape (see Japanese Patent Application Publication 2017-159420, for example). The socket includes an attachment part for the rotating tool on the bottom side, and includes an engaging part for the fastener on the inner peripheral surface so as to extend toward the opening side.

In a state where the attachment part of the socket is coupled to the rotating shaft of the rotating tool, an operator, who fastens the fastener with use of the socket, when the fastener is a bolt, for example, inserts the head of the bolt into the opening of the socket. Accordingly, the socket is engaged with the fastener. Then, when the operator turns on the rotating tool to rotate the rotating shaft, the socket which rotates with the rotating shaft fastens the fastener.

SUMMARY OF THE INVENTION

The fastening operation with use of the rotating tool requires that the socket needs to be rotated in a state where the rotation axis of the socket is aligned with the rotation axis of the fastener. Therefore, ideally, it is conceivable to employ a stationary fixation device, which does not require an operator, for fastening the fastener in a state where the rotation axis of the socket is always aligned with the rotation axis of the fastener.

However, the fastening process employing the fixation device as described above may hinder production flexibility and therefore is not employed except for special fastening processes. Further, a proficiency level is different from operator to operator, and there can be a failure that the socket is inadvertently rotated while the rotation axis of the socket is not aligned with the rotation axis of the fastener, to have the fastener stripped by the socket.

Therefore, such a socket is desired, with which an ideal fastening operation is more reliably performed, having the rotation axis of the socket aligned with the rotation axis of the fastener without use of any special fixation device or regardless of the proficiency level of the operator.

An object of the present invention is to provide a socket, with which an ideal fastening operation is more reliably performed, having the rotation axis of the socket aligned with the rotation axis of a fastener without use of any special fixation device or regardless of the proficiency level of the operator.

A socket to solve the problem described above includes: an outer socket having a substantially cylindrical shape, an inner socket having a substantially cylindrical shape and arranged to face an inner periphery of the outer socket; an urging member configured to urge the inner socket toward one end of the outer socket; and a lock/unlock mechanism configured to allow the inner socket positioned at the one end of the outer socket by the urging member to be rotated, with respect to the outer socket, and to restrict the inner socket displaced toward the other end of the outer socket against an urging force of the urging member from being rotated with respect to the outer socket, wherein a connection part to be connected with a rotating tool is formed at either one end in an axial direction of the socket, and a fitting part to be connected with a fastener is formed at the other end.

With the socket of the present invention, the ideal fastening operation is more reliably performed, having the rotation axis of the socket aligned with the rotation axis of the fastener without use of any special fixation device or regardless of the proficiency level of the operator.

DESCRIPTION OF THE EMBODIMENTS

Next, a description will be given of a socket according to an embodiment (present embodiment) for implementing the present invention in detail with reference to the drawings as appropriate.

Hereinafter, the present invention will be specifically described about a socket which is used for an impact wrench as a rotating tool, as an example. It is assumed that the impact wrench can transmit a torque in both forward and reverse rotation directions with respect to the socket. In other words, the impact wrench can fasten and loosen a fastener (such as a bolt or nut) having either one of the forward and reverse screws.

The socket according to the present embodiment has a lock/unlock mechanism, as a main feature, to allow for easy switching between transmission and non-transmission of a torque to the fastener.

Figure 1:
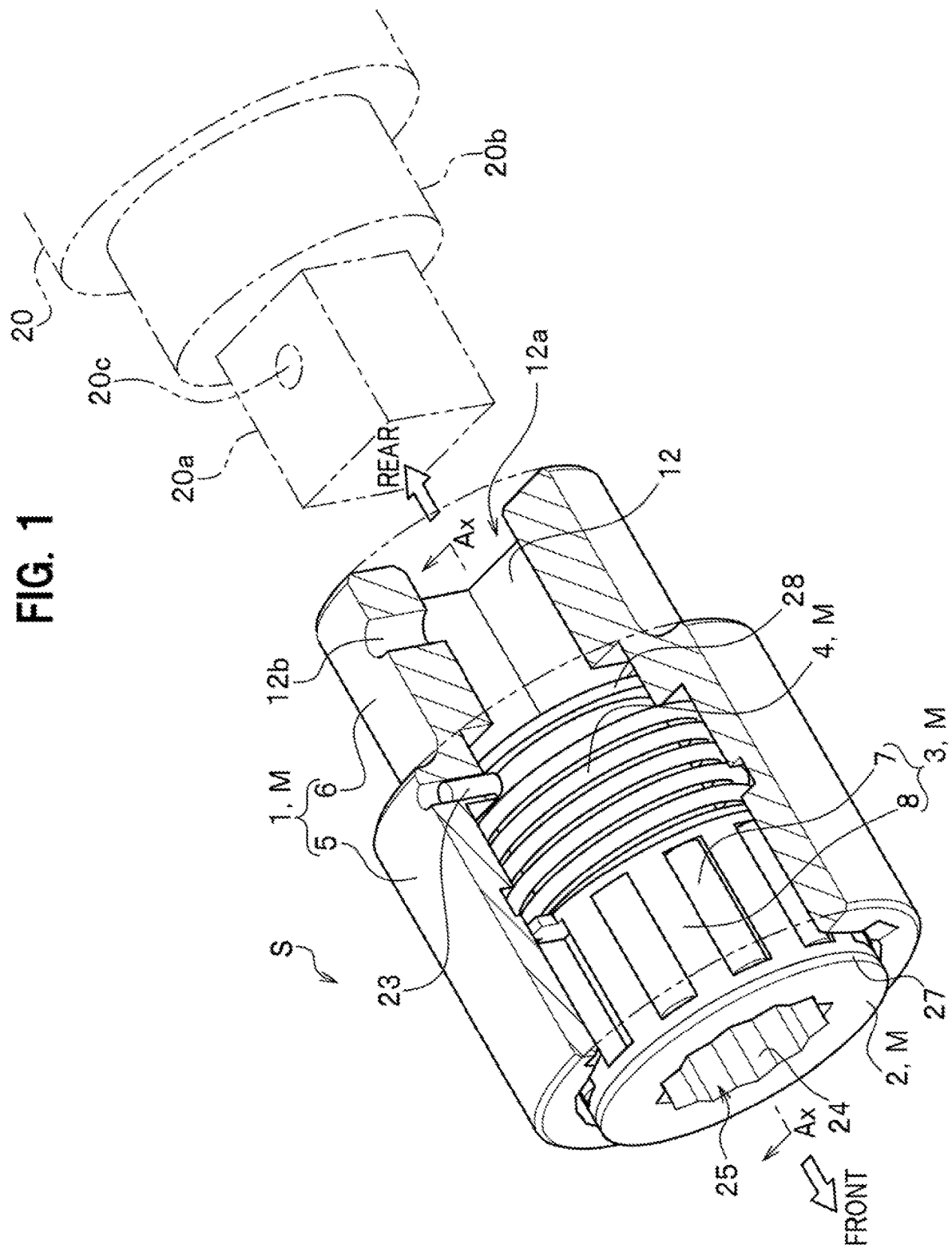
FIG. 1 is a perspective view of a socket according to an embodiment of the present invention, to illustrate inside thereof by cutting away a portion of the socket.

FIG. 1 is a perspective view of a socket S according to the present embodiment, to illustrate inside thereof by cutting away a portion of the socket S. In the following description, front-rear directions are based on the front-rear direction illustrated in FIG. 1, with a fitting part 24 with the fastener (not shown) being the front and a connection part 12 with a rotating tool 20 being the rear.

As illustrated in FIG. 1, the socket S includes the connection part 12 into which a square drive 20a of the rotating tool 20 is inserted, and the fitting part 24 into which the fastener (not shown) fits.

The connection part 12 is formed in a cylindrical shape. The connection part 12 has a square drive fitting hole 12a inside thereof, which is a space having a square prism shape, so as to correspond to the outer shape of the square drive 20a.

Further, the connection part 12 has a pin insertion hole 12b, which penetrates through inner and outer portions of the connection part 12, at a position corresponding to a retention hole 20c of the square drive 20a inserted into the square drive fitting hole 12a.

A locking pin (not shown) is inserted into the pin insertion hole 12b so as to extend into a retention hole 20c of the square drive 20a inserted into the connection part 12. Thus, the socket S is coaxially attached to a rotating part 20b of the rotating tool 20.

The fitting part 24 of the socket S having a cylindrical outer shape has a fitting hole 25 inside thereof for the fastener (not shown). The fastener is housed in the fitting hole 25 so as to be coaxial with the socket S. The fitting hole 25 will be described in detail below.

The socket S of the present embodiment mainly includes an outer socket 1, an inner socket 2, a rolling bearing 3, and a coil spring 4.

Note that the rolling bearing 3 corresponds to an "intermediate member" in the appended claims. Further, the coil spring 4 corresponds to an "urging member" in the appended claims.

<Outer Socket>

As illustrated in FIG. 1, the outer socket 1 substantially forms an outer shape of the socket S. Accordingly, hereinafter, the outer socket 1 may be referred to as a socket body in contrast to the inner socket 2.

The outer socket 1 includes a larger-diameter part 5 at the front and a smaller-diameter part 6, which is smaller in diameter than the larger-diameter part 5 at the rear, to have a stepped cylindrical shape.

The smaller-diameter part 6 forms the connection part 12 having the square drive fitting hole 12a into which the square drive 20a (see FIG. 1) is inserted.

The inner socket 2, the rolling bearing 3, and the coil spring 4 are housed inside the larger-diameter part 5.

As described in detail below, the rolling bearing 3 is arranged at the front part of the larger-diameter part 5 and the coil spring 4 is arranged at the rear part of the larger-diameter part 5. The inner socket 2 is arranged inside the rolling bearing 3 and the coil spring 4 to extend in the front-rear direction of the larger-diameter part 5.

In FIG. 1, a reference numeral 23 denotes a retaining pin to come in contact with a second flange 28, to be described below, of the inner socket 2.

Figure 2A:
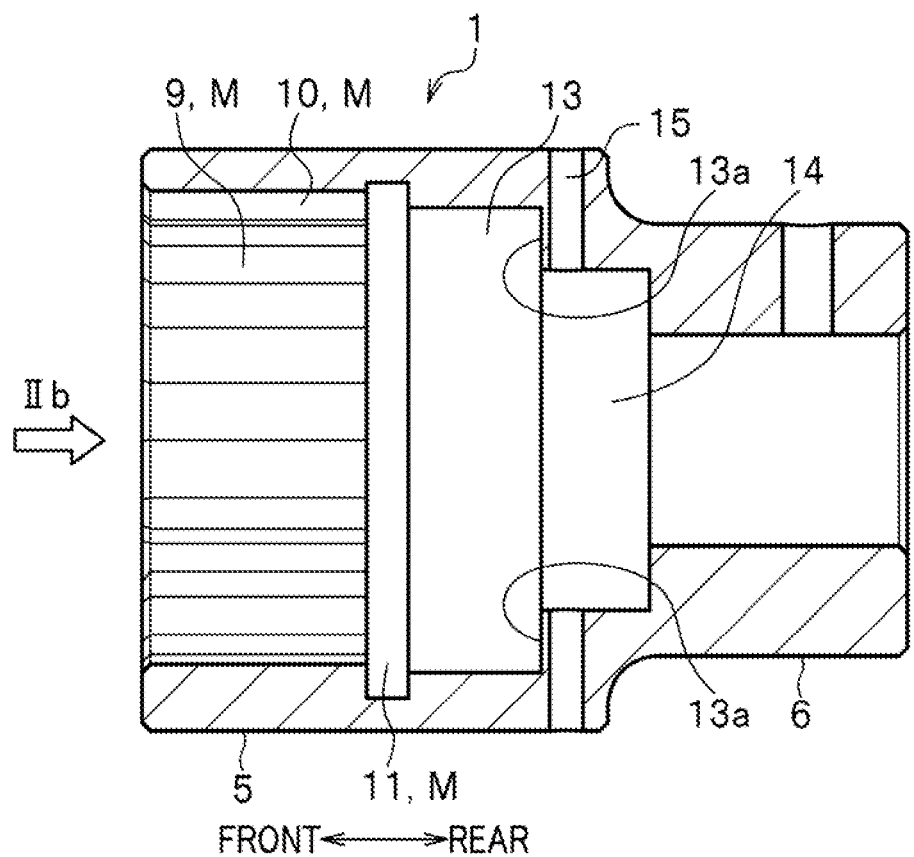
FIG. 2A is a cross-sectional view taken along a line Ax-Ax in FIG. 1 along the central axis of an outer socket.
Figure 2B:
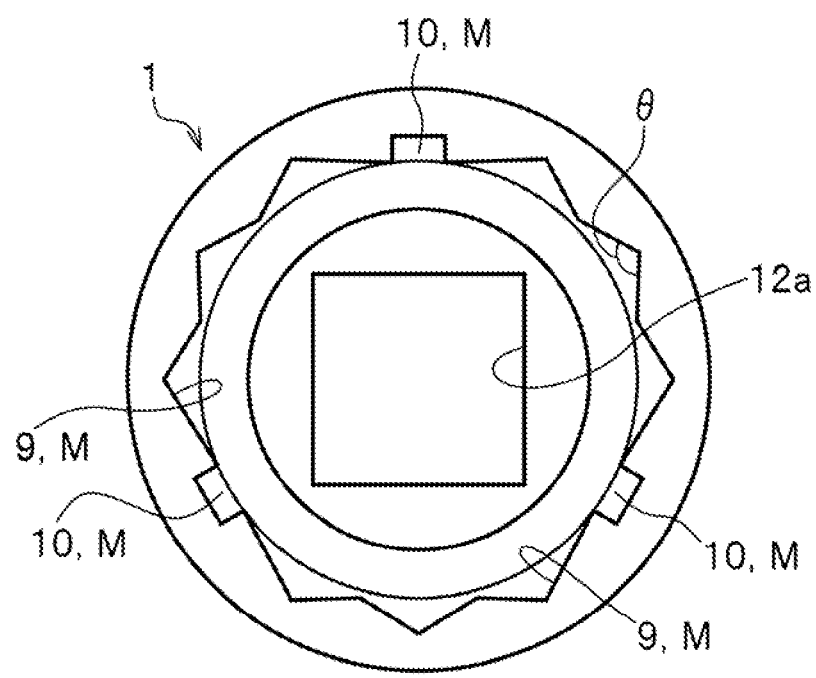
FIG. 2B is a front view as viewed from a direction indicated by an arrow IIb in FIG. 2A.

FIG. 2A is a cross-sectional view of the outer socket 1 taken along a line Ax-Ax in FIG. 1 along the central axis of the outer socket 1, and FIG. 2B is a front elevational view (front view) as viewed from a direction indicated by an arrow IIb in FIG. 2A.

As illustrated in FIG. 2A, the outer socket 1 has a plurality of V-shaped grooves 9 in the inner peripheral surface corresponding to a position where the rolling bearing 3 (see FIG. 1) is arranged. The V-shaped grooves 9 are formed in the inner peripheral surface of the outer socket 1 so as to extend in the axial direction of the socket.

As illustrated in FIG. 2B, the V-shaped grooves 9 are formed in parallel in the circumferential direction of the inner peripheral surface of the outer socket 1. Note that an opening angle θ of the V-shaped groove 9 in FIG. 2B is exaggeratedly indicated for convenience of drawing, and is different from the actual opening angle θ. Incidentally, the opening angle θ of the V-shaped groove 9 in the present embodiment is assumed to be from about 145° to 170°, but is not limited thereto.

As described below, the V-shaped groove 9 has tapered parts 9a (see FIGS. 6A and 6B) where a needle bearing 7 (see FIGS. 6A and 6B) is wedged by a wedge effect.

Further, as illustrated in FIG. 2A, the outer socket 1 includes straight grooves 10 and a circumferential groove 11 in the inner peripheral surface corresponding to a position where the rolling bearing 3 (see FIG. 1) is arranged. Note that the straight grooves 10 correspond to a "restriction part" in the appended claims. As will be described in detail below, protrusions 19 (see FIG. 4A) of the rolling bearing 3 (see FIG. 1) are engaged with the straight grooves 10 so that the rolling bearing 3 is restricted from being moved in the circumferential direction.

The straight grooves 10 and the circumferential groove 11 each are assumed to have a rectangular shape in cross-sectional view.

The straight grooves 10 are formed in the inner peripheral surface of the outer socket 1 so as to extend in the axial direction of the socket.

As illustrated in FIG. 2B, in the present embodiment, three straight grooves 10 are formed in the inner peripheral surface of the outer socket 1 at equal intervals in the circumferential direction.

Incidentally, as will be described in detail below, the three straight grooves 10 are formed to guide the respective three protrusions 19 (see FIGS. 4A and 4B) of the rolling bearing 3 (see FIGS. 4A and 4B) in the axial direction of the socket.

As illustrated in FIG. 2A, the circumferential groove 11 is formed to extend in the circumferential direction, in an annular shape, in the inner peripheral surface of the outer socket 1. The circumferential groove 11 is continuous to the rear ends of the three straight grooves 10 (see FIG. 2B).

As illustrated in FIG. 2A, a spring housing 13 is formed inside the outer socket 1a and behind the circumferential groove 11, in which the coil spring 4 (see FIG. 1) inserted in the inner socket 2 (see FIG. 1) is arranged.

A spring seat 13a is formed at the rear end of the outer periphery of the spring housing 13, to support the rear part of the coil spring 4 (see FIG. 1).

As illustrated in FIG. 2A, the outer socket 1 has an escape space 14 between the larger-diameter part 5 and the smaller-diameter part 6 for the rear part of the inner socket 2 (see FIG. 1). As described below, the escape space 14 allows the inner socket 2 (see FIG. 1) to be displaced rearward against the urging force of the coil spring 4 (see FIG. 1).

Note that, in FIG. 2A, a reference numeral 15 denotes an insertion hole for the retaining pin 23 (see FIG. 1) of the inner socket 2, to be described below. Further, in FIG. 2B, the reference numeral 12a denotes the square drive fitting hole to be seen through the escape space 14 as viewed from the front.

<Inner Socket>

Next, the inner socket 2 (see FIG. 1) will be described.

As illustrated in FIG. 1, the fitting hole 25 for the fastener (not shown) described above is formed in the front part of the inner socket 2, to form the fitting part 24 of the socket S.

Further, the rolling bearing 3 is fitted on the front part of the inner socket 2.

The inner socket 2, on which the rolling bearing 3 is fitted, is urged at the front part by the coil spring 4 described below so that a part of the front part of the inner socket 2 protrudes forward with respect to the front end of the outer socket 1 (socket body).

Figure 3A:
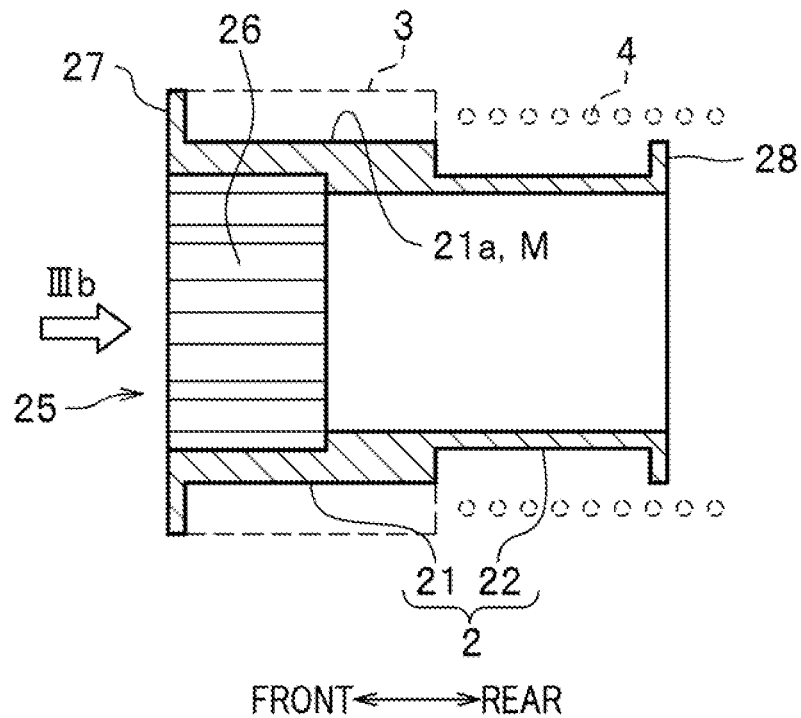
FIG. 3A is a cross-sectional view taken along the line Ax-Ax in FIG. 1 along the central axis of an inner socket.
Figure 3B:
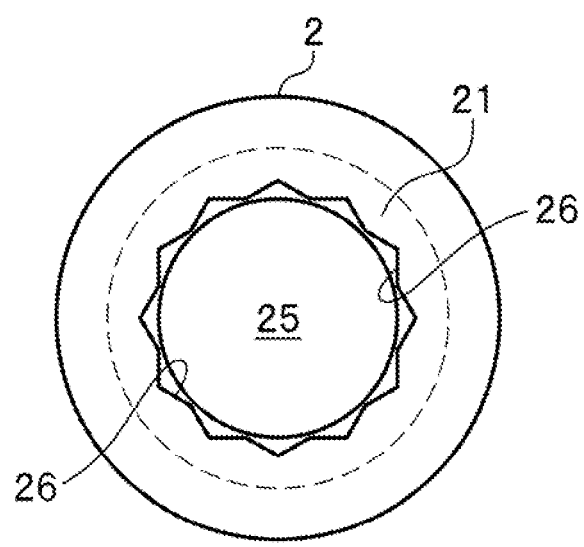
FIG. 3B is a front view as viewed from a direction indicated by an arrow IIIb in FIG. 3A.

FIG. 3A to be referred to next is a cross-sectional view taken along the line Ax-Ax in FIG. 1 along the central axis of the inner socket 2, and FIG. 3B is a front view as viewed from the direction indicated by an arrow IIIb in FIG. 3A.

As illustrated in FIG. 3A, the inner socket 2 has a stepped cylindrical shape including a larger-diameter part 21 on the front side and a smaller-diameter part 22, which is smaller in diameter than the larger-diameter part 5, on the rear side.

As illustrated in FIGS. 3A and 3B, a plurality of V-shaped grooves 26 are formed in the fitting hole 25 of the larger-diameter part 21. As illustrated in FIG. 3B, the V-shaped grooves 26 are formed in the inner peripheral surface of the larger-diameter part 21 circumferentially to extend along the longitudinal length of the socket.

Incidentally, in the present embodiment, twelve V-shaped grooves 26 are circumferentially formed. Therefore, the fitting hole 25 corresponds to hexagonal and dodecagonal fasteners but is not limited thereto, and may be configured to correspond to various fasteners.

Further, as illustrated in FIG. 3A, a first flange 27 is formed around the opening of the fitting hole 25 so as to protrude radially outward.

A second flange 28 is formed at the rear end of the smaller-diameter part 22 of the inner socket 2 so as to protrude radially outward.

In FIG. 3A, the rolling bearing 3 fitted on the inner socket 2 and the coil spring 4 are indicated by imaginary lines (dotted lines).

<Rolling Bearing>

Next, the rolling bearing 3 (see FIG. 1) will be described.

The rolling bearing 3 corresponds to the "intermediate member" in the appended claims.

As illustrated in FIG. 1, the rolling bearing 3 has a substantially cylindrical shape.

As illustrated in FIG. 3A, the rolling bearing 3 is coaxially arranged on the larger-diameter part 21 of the inner socket 2.

As illustrated in FIG. 1, the rolling bearing 3 includes needle bearings 7 as rolling elements and a retainer 8 to retain the needle bearings 7.

The needle bearings 7 each have an elongated cylindrical shape and are arranged in the inner socket 2 along the circumferential direction.

Further, the needle bearings 7 each are arranged such that the axial direction thereof runs along the axial direction of the socket S.

Specifically, as described below, the needle bearings 7 are arranged to correspond to the respective V-shaped grooves 9 of the outer socket 1 (see FIGS. 6A and 6B).

Each of the needle bearings 7 is held in a bearing housing 18a (see FIG. 4A) of the retainer 8 to be described next.

Figure 4A:
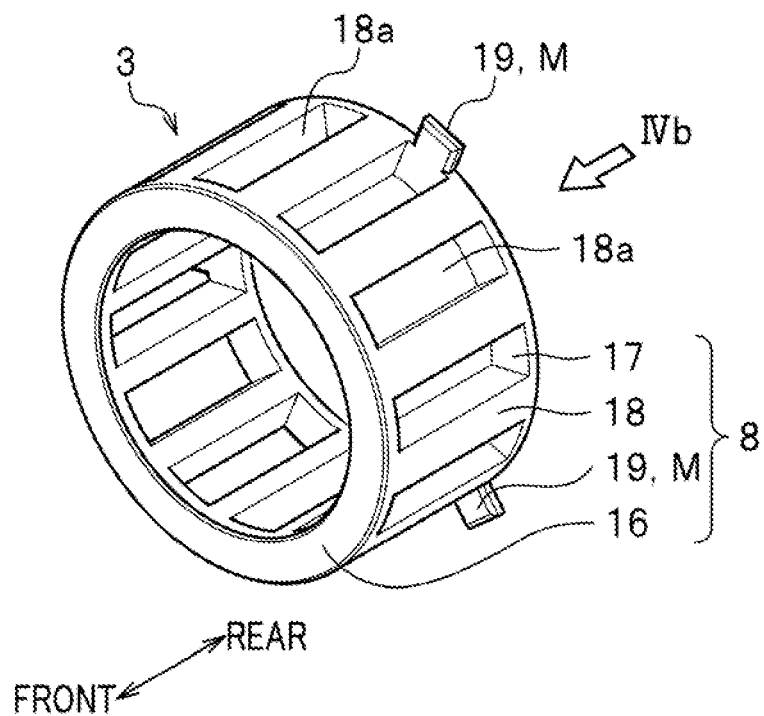
FIG. 4A is a perspective view of a retainer.
Figure 4B:
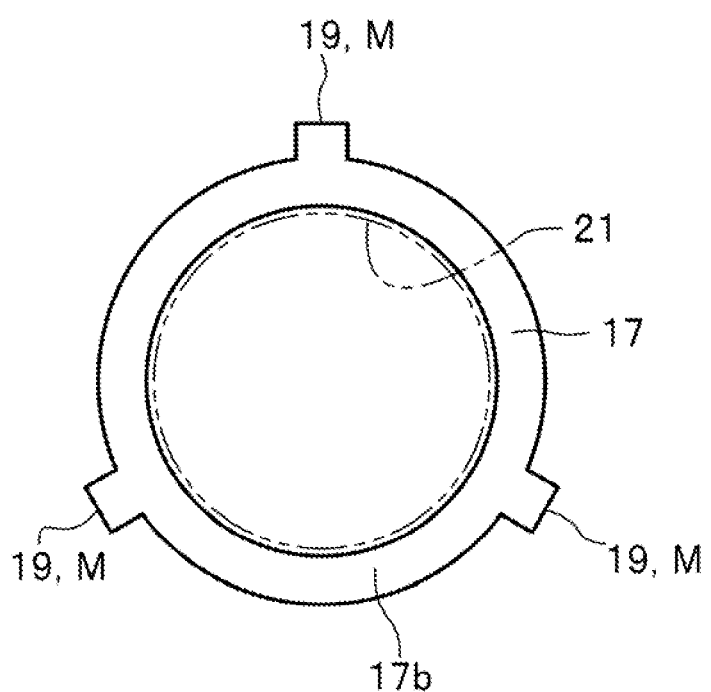
FIG. 4B is a rear view of the retainer as viewed from a direction indicated by an arrow IVb in FIG. 4A.

FIG. 4A is a perspective view of the retainer 8 forming the rolling bearing 3, and FIG. 4B is a rear view (rear surface view) of the retainer 8 as viewed from a direction indicated by an arrow IVb in FIG. 4A.

As illustrated in FIG. 4A, the retainer 8 in the present embodiment substantially forms the outer shape of the rolling bearing 3 (see FIG. 1), and has a substantially cylindrical shape except the bearing housings 18a to rotatably house the needle bearing 7 (see FIG. 1).

The retainer 8 includes a front annular part 16, a rear annular part 17 arranged to face the front annular part 16 in the front-rear direction, the protrusions 19 which protrude radially outward from the rear annular part 17, and a body part 18 which connects the front annular part 16 with the rear annular part 17 to form a peripheral side surface.

The front annular portion 16 in the present embodiment is formed of an annular plate.

As described in detail below, the front end surface of the front annular part 16 is brought in contact with the rear surface of the first flange 27 illustrated in FIG. 3A when the rolling bearing 3 is attached to the inner socket 2.

The rear annular part 17 is symmetrical with the front annular part 16 in the front-rear direction except that the protrusions 19 are formed.

As illustrated in FIG. 4B, a spring seat 17b is formed on the rear end surface of the rear annular part 17 to support the front part of the coil spring 4 (see FIG. 1), as will be described in detail below.

As illustrated in FIG. 4A, each protrusion 19 is formed of a piece having a rectangular plate shape in planar view, which extends to be flush with the rear annular part 17.

As illustrated in FIG. 4B, the three protrusions 19 in the present embodiment are formed on the rear annular part 17 at equal spaces along the circumferential direction thereof. These protrusions 19 are formed to correspond to the straight grooves 10 illustrated in FIG. 2B.

As illustrated in FIG. 4A, a plurality of bearing housings 18 mentioned above are formed in the body part 18 along the circumferential direction of the retainer 8. The bearing housing 18a has an elongated rectangular shape in the axial direction of the socket S to correspond to the shape of the needle bearing 7 (see FIG. 1). The rolling contact surfaces for the needle bearing 7 (see FIG. 1) arranged in the bearing housing 18a are exposed to inside and outside the bearing housing 18a in the radial direction, respectively.

In FIG. 4B, the larger-diameter part 21 of the inner socket 2 is arranged inside the retainer 8 as described above as indicated by an imaginary line (two-dot chain line) so that the needle bearings 7 (see FIG. 1) rolls on the peripheral surface of the larger-diameter part 21.

<Coil Spring>

As illustrated in FIG. 1, the coil spring 4 is arranged inside the outer socket 1 and urges forward the rolling bearing 3 and the inner socket 2 contacted by the rolling bearing 3 through the first flange 27.

As described above, the coil spring 4 described above has the front part thereof which is seated on the spring seat 17b (see FIG. 4B) formed in the retainer 8. Further, the rear part of the coil spring 4 is seated on the spring seat 13a (see FIG. 2A) formed in the outer socket 1.

<Lock/Unlock Mechanism>

Next, the lock/unlock mechanism according to the present embodiment will be described.

The lock/unlock mechanism according to the present embodiment sets the socket S to be in an unlocked state as described in FIG. 1 or in a locked state. In the unlocked state, the rotational movement of the inner socket 2 with respect to the outer socket 1 is allowed, and, in the locked state, the inner socket 2 is fixed to the outer socket 1 so that torque inputted from the rotating tool 20 to the outer socket 1 is transmitted to the inner socket 2.

As illustrated in FIG. 1, a lock/unlock mechanism M according to the present embodiment mainly includes the outer socket 1, the inner socket 2, the rolling bearing 3, and the coil spring 4.

Specifically, the lock/unlock mechanism M mainly includes the coil spring 4 (see FIG. 1), the protrusions 19 of the rolling bearing 3 (see FIG. 4A), the straight grooves 10 (see FIG. 2A and FIG. 2B) of the outer socket 1, the circumferential groove 11 (see FIG. 2A) of the outer socket 1, the V-shaped grooves 9 (see FIG. 2B) of the outer socket 1, and a peripheral surface 21a (see FIG. 3A) of the larger-diameter part 21 (see FIG. 3A) of the inner socket 2.

Figure 5A:
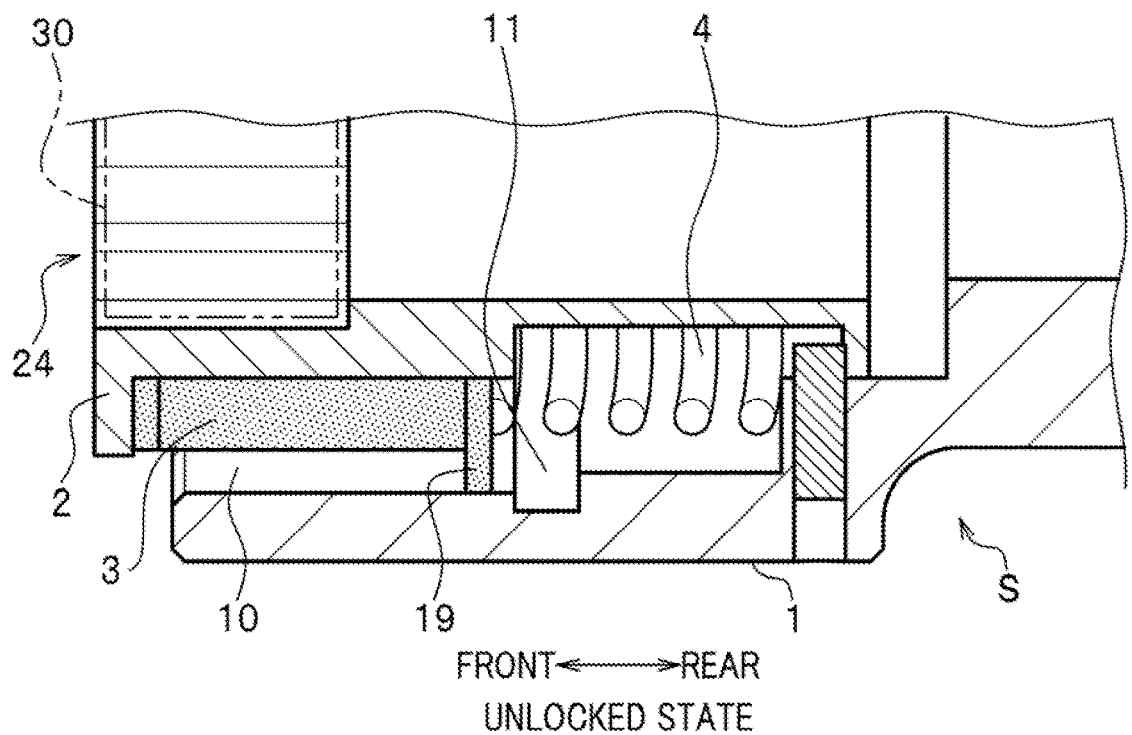
FIG. 5A illustrates an unlocked state of the socket.
Figure 5B:
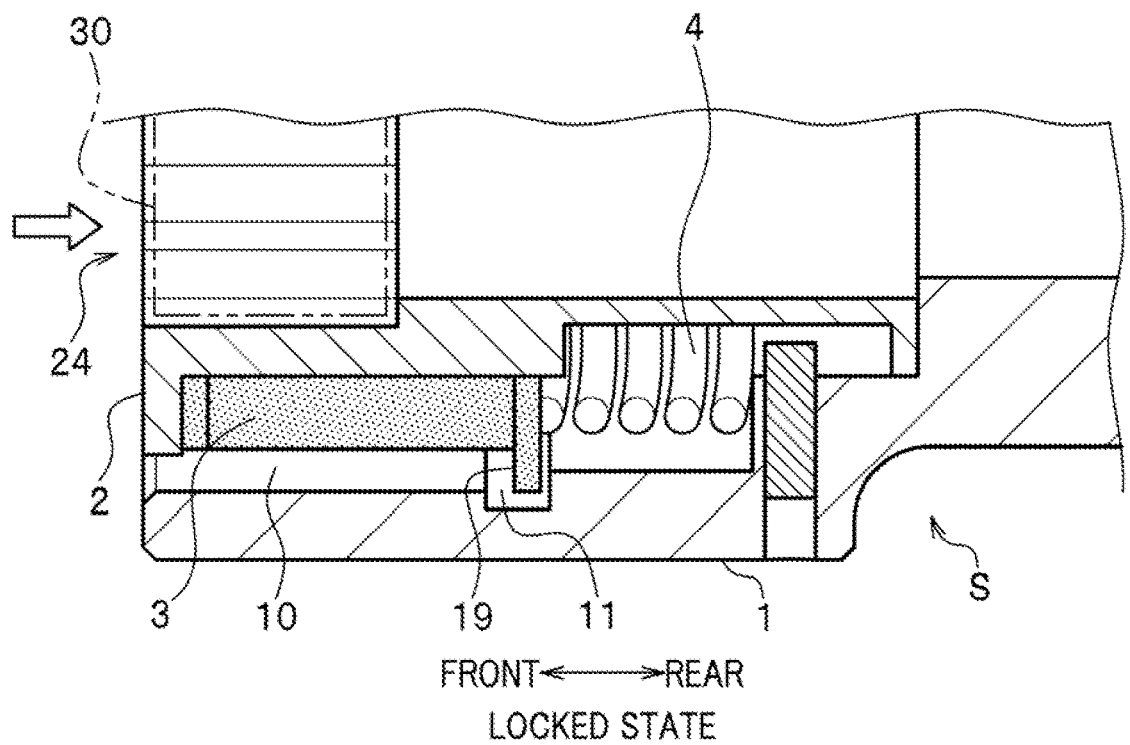
FIG. 5B illustrates a locked state of the socket.

FIG. 5A illustrates the unlocked state of the socket S mounted to the rotating tool 20 (see FIG. 1). FIG. 5B illustrates the locked state of the socket S mounted to the rotating tool 20 (see FIG. 1). In FIGS. 5A and 5B, a fastener 30 arranged in the fitting part 24 of the socket S is indicated by an imaginary line (two-dot chain line).

As illustrated in FIG. 5A, the inner socket 2 of the socket S in the unlocked state is freely rotatable with respect to the outer socket 1.

Specifically, the protrusions 19 of the rolling bearing 3 are placed in the straight grooves 10 of the outer socket 1 so that the straight grooves 10 and the protrusions 19 are engaged with each other to restrict rotation of the rolling bearing 3 in the circumferential direction with respect to the outer socket 1.

On the other hand, the inner socket 2 is freely rotatable, with respect to the outer socket 1, on the inner periphery of the rolling bearing 3, which is engaged with the outer socket 1, by way of the bearing action of the rolling bearing 3.

That is, the torque inputted to the outer socket 1 by the rotating tool 20 (see FIG. 1) is not transmitted to the fastener 30 placed in the fitting part 24 of the socket S in the unlocked state.

Next, the socket S in the locked state will be described.

When the socket S of the present embodiment is in the unlocked state, in which the fitting part 24 formed in the front part of the inner socket 2 protrudes with respect to the front surface of the outer socket 1 (socket body), the inner socket 2 is retracted against the urging force of the coil spring 4 make the socket transition to the locked state.

Specifically, as illustrated in FIG. 5B, the inner socket 2 is retracted in the direction indicated by the white arrow to take out the protrusions 19 of the rolling bearing 3 out of the straight grooves 10 of the outer socket 1, so that the locked state of the inner socket 2 with respect to the outer socket 1 is made. That is, the protrusions 19 of the rolling bearing 3 are moved from the straight grooves 10 to the circumferential groove 11 so that the rotation restriction of the rolling bearing 3 in the circumferential direction with respect to the outer socket 1 is released to make the locked state.

Note that the socket S of the present embodiment is designed such that the front surface of the inner socket 2 is flush with the front surface of the outer socket 1 in the locked state.

Figure 6A:
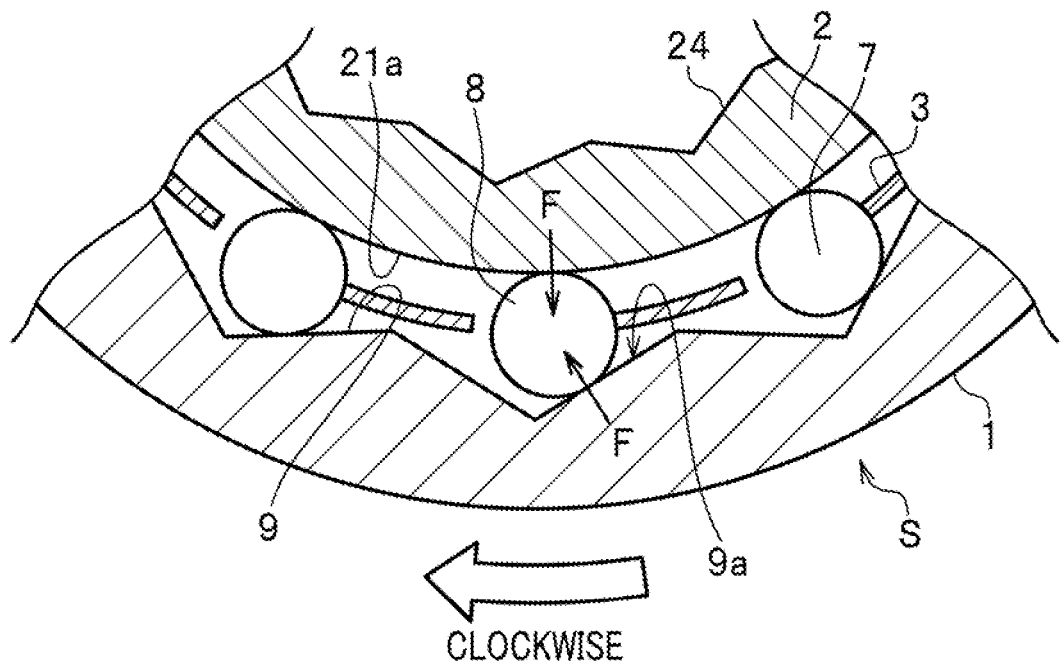
FIG. 6A is a partial cross-sectional view to illustrate inside the socket in the locked state when a rotating tool rotates clockwise.
Figure 6B:
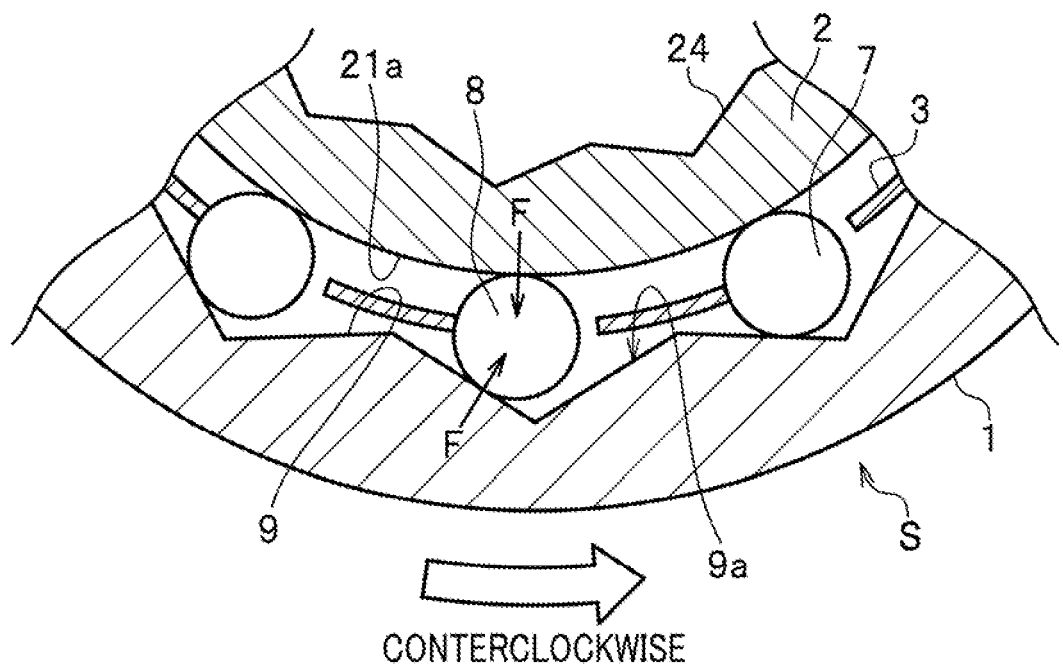
FIG. 6B is a partial cross-sectional view to illustrate inside the socket in the locked state when the rotating tool rotates counterclockwise.

FIGS. 6A and 6B to be referred to next are partial cross-sectional views of the cross sections intersecting the axial direction of the socket S to illustrate inside the socket S in the locked state. FIG. 6A is a partial cross-sectional view of the socket S as viewed from the rear when the rotating tool 20 is rotated clockwise. FIG. 6B is a partial cross-sectional view of the socket S as viewed from the rear when the rotating tool 20 is rotated counterclockwise.

First, as illustrated in FIG. 6A, a case is assumed, in which the outer socket 1 is rotated clockwise by the rotating tool 20 (see FIG. 1). In this case, the rolling bearing 3 is not engaged with the outer socket 1, which is different from the case of the unlocked state (see FIG. 5A).

Therefore, the rolling bearing 3 is allowed to rotate in the circumferential direction.

When the outer socket 1 is rotated clockwise in such a state, the needle bearings 7 of the rolling bearing 3 are wedged between the outer socket 1 and the inner socket 2 by a wedge effect between the tapered parts 9a formed by the V-shaped grooves 9 of the outer socket 1 and the peripheral surface 21a of the inner socket 2. That is, the needle bearings 7 receive a reaction force F from the outer socket 1 and the inner socket 2.

Accordingly, the inner socket 2 is locked with respect to the outer socket 1.

The torque inputted to the outer socket 1 by the rotating tool 20 (see FIG. 1) is transmitted to the fastener 30 (see FIG. 5B) placed in the fitting part 24 of the socket S in the locked state.

Next, as illustrated in FIG. 6B, a case is assumed, in which the outer socket 1 is rotated counterclockwise by the rotating tool 20 (see FIG. 1). Also, in this case, the rolling bearing 3 is allowed to rotate in the circumferential direction, which is different from the case of the unlocked state (see FIG. 5A). When the outer socket 1 is rotated counterclockwise in such a state, the needle bearings 7 of the rolling bearing 3 are wedged between the outer socket 1 and the inner socket 2 by the wedge effect. That is, the needle bearings 7 receive the reaction force F from the outer socket 1 and the inner socket 2.

Thus, even when the outer socket 1 is rotated counterclockwise, the torque inputted to the outer socket 1 by the rotating tool 20 (see FIG. 1) is transmitted to the fastener 30 (see FIG. 5B).

<Assembly Method of Socket>

Hereinafter, a description will be given of an example of an assembly method of the socket S (see FIG. 1).

In the assembly method, first of all, the rolling bearing 3 (indicated by the imaginary line (dotted line) in FIG. 3A) is inserted on the outer periphery of the larger-diameter part 21 of the inner socket 2, as illustrated in FIG. 3A.

Next, the coil spring 4 is inserted on the outer periphery of the smaller-diameter part 22 of the inner socket 2.

Then, in the assembly method, an assembly of the inner socket 2 including the rolling bearing 3 and the coil spring 4 is inserted in the outer socket 1.

At this time, the protrusions 19 of the rolling bearing 3 illustrated in FIG. 4A are fitted in the straight grooves 10 of the outer socket 1 illustrated in FIG. 2B. The assembly of the inner socket 2 is inserted into the outer socket 1 while the protrusions 19 are guided by the straight grooves 10 in the axial direction of the socket S.

Thereafter, once the rear part of the coil spring 4 (see FIG. 1) reaches the spring seat 13a of the outer socket 1, the coil spring 4 is compressed between the spring seat 13a of the spring housing 13 and the spring seat 17b of the rolling bearing 3 to start generating a repulsive force. That is, the coil spring 4 starts urging the rolling bearing 3 and the inner socket 2 forward.

When the assembly of the inner socket 2 is further inserted rearward in the outer socket 1 against the urging force, the second flange 28 of the inner socket 2 illustrated in FIG. 3A reaches the dead end of the escape space 14 in the outer socket 1 illustrated in FIG. 2A. Specifically, the second flange 28 of the inner socket 2 illustrated in FIG. 3A is located behind the insertion hole 15 formed in the outer socket 1 illustrated in FIG. 2A.

Further, in the assembly method, as illustrated in FIG. 1, the retaining pin 23 is inserted into the insertion hole 15 so as to be located in front of the second flange 28 of the inner socket 2. Thus, the retaining pin 23 comes into contact with the second flange 28 so that the inner socket 2 and the rolling bearing 3 are supported in the outer socket 1 while being urged forward by the coil spring 4.

Then, as illustrated in FIG. 1, the inner socket 2 protrudes forward with respect to the front surface of the socket body, that is, the outer socket 1 substantially forming the outer shape of the socket S, in a state where the inner socket 2 and the rolling bearing 3 are supported in the outer socket 1 in this manner.

Further, the protrusions 19 of the rolling bearing 3 illustrated in FIGS. 4A and 4B are retained in the straight grooves 10 illustrated in FIGS. 2A and 2B, in a state where the inner socket 2 and the rolling bearing 3 are supported in the outer socket 1. Accordingly, the socket S is in an initial state as being set in the unlocked state.

Advantageous Effects

Next, a description will be given of advantageous effects of the socket S of the present embodiment.

The socket S of the present embodiment allows the inner socket 2 to be rotated with respect to the outer socket 1 in a state where the inner socket 2 is positioned at one end of the outer socket 1 by the coil spring 4 (urging member).

That is, as described above, the torque inputted to the outer socket 1 by the rotating tool 20 (see FIG. 1) is not transmitted to the fastener 30 placed in the fitting part 24 of the inner socket 2 in the unlocked state.

Further, in the socket S of the present embodiment, the inner socket 2 is displaced toward the other end of the outer socket 1 against the urging force of the coil spring 4 to restrict the inner socket 2 from being rotated with respect to the outer socket 1.

That is, as described above, the torque inputted to the outer socket 1 by the rotating tool 20 (see FIG. 1) is transmitted to the fastener 30 placed in the fitting part 24 of the inner socket 2 in the locked state.

That is, in the socket S of the present embodiment, after the fastener 30 is placed in the fitting part 24 in the unlocked state, the inner socket 2 is further pushed in the outer socket 1 against the urging force so that the torque is transmitted to the fastener 30.

Therefore, with the socket S, an ideal fastening operation is performed more reliably, in which the rotation axis of the socket S and the rotation axis of the fastener are aligned with each other without use of a special fixation device or regardless of the proficiency level of the operator, and this cannot be achieved with any related art.

This prevents a failure of the fastening operation such that the fastener is stripped by the socket S, and hence damage such as a flaw of the fastener is prevented.

Further, in the socket S of the present embodiment, the fitting part 24 formed in the inner socket 2 protrudes with respect to the outer socket 1 (socket body) in the axial direction of the socket S, when the inner socket 2 is in the unlocked state.

With the socket S as described above, the fitting part 24 protrudes with respect to the socket body, to allow the fastener such as a bolt or nut to be easily inserted into the fitting part 24. Further, with the socket S as described above, the fitting part 24 protrudes with respect to the socket body, to allow the operator to visually recognize that the fastener has been fitted in the fitting part 24.

Further, in the socket S of the present embodiment, the torque of the rotating tool 20 inputted through the connection part 12 is transmittable between the outer socket 1 and the inner socket 2 by the rolling bearing 3, having a substantially cylindrical shape, arranged between the outer socket 1 and the inner socket 2.

With the socket S as described above, the torque is extensively transmitted between the peripheral surfaces of the outer socket 1 and inner socket 2 through the rolling bearing 3 having a substantially cylindrical shape, to reduce the both components being worn.

Further, in the socket S of the present embodiment, the straight grooves 10 (restriction part) of the outer socket 1 are engaged with the protrusions 19 of the rolling bearing 3 to maintain the unlocked state of the inner socket 2.

With the socket S as described above, the locked state and unlocked state of the inner socket 2 are switched by the simple structure.

Further, in the socket S of the present embodiment, the tapered parts 9a of the outer socket 1 forming the lock/unlock mechanism M is formed by the V-shaped grooves 9. Still further, in the socket S, the plurality of needle bearings 7 are arranged at positions corresponding to the V-shaped grooves 9 to roll on the outer peripheral surface of the inner socket 2.

With the socket S as described above, a bearing effect is imparted to the inner socket 2 in the unlocked state with the simple structure, and the inner socket 2 is switched from the unlocked state to the locked state.

Further, the socket S of the present embodiment includes the circumferential groove 11 in which the protrusions 19 of the rolling bearing 3 are fitted to allow the rolling bearing 3 to be moved in the circumferential direction, and the straight grooves 10 (restriction part) which extend in the axial direction of the socket S to continue to the circumferential groove 11 and which have the protrusions 19 fitted therein to restrict the rolling bearing 3 from being moved in the circumferential direction.

With the socket S as described above, the unlocked state and locked state of the inner socket 2 are easily switched by the inner socket 2 having the fitting part 24 therein being moved in the front-rear direction.

The present embodiment has been described above, but the present invention is not limited to the embodiment described above and may be implemented in various forms.

In the embodiment described above, as illustrated in FIG. 1, the socket S has been described, which includes the connection part 12 in the outer socket 1 for connection with the rotating tool 20, and the fitting part 24 in the inner socket 2 for the fastener being fitted thereto.

However, the socket S may be configured to include the connection part 12 in the inner socket 2 for connection with the rotating tool 20, and the fitting part 24 in the outer socket 1 for a fastener being fitted thereto, although not illustrated.

Further, in the embodiment described above, as illustrated in FIGS. 6A and 6B, the socket S has been described, in which the rolling contact surface for the needle bearings 7 is provided on the outer peripheral surface of the inner socket 2, and the V-shaped grooves 9 forming the tapered parts 9a are formed in the inner peripheral surface of the outer socket 1.

However, the socket S is not limited to the embodiment described above as long as the tapered parts 9a are formed so as to exert the wedge effect.

Figure 7:
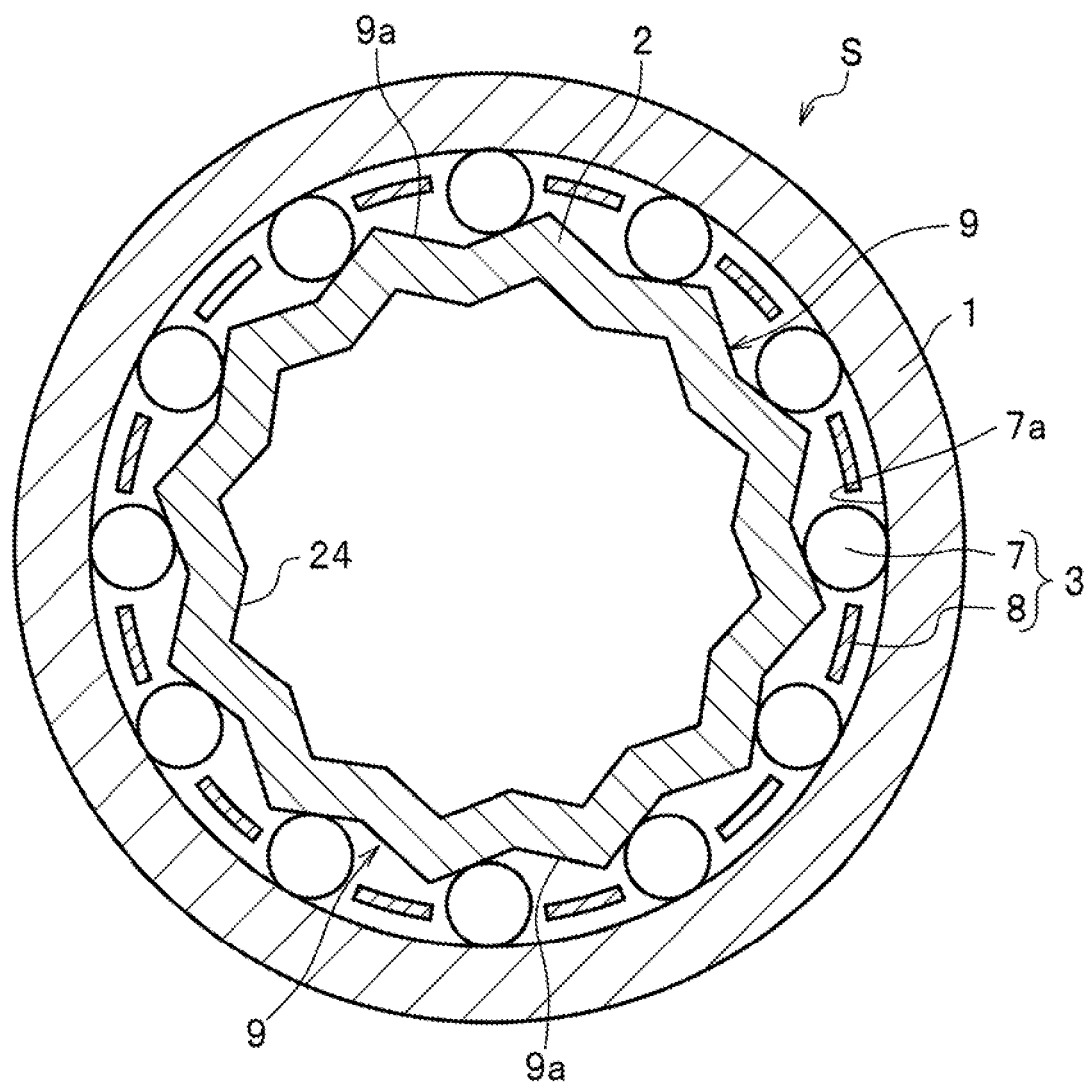
FIG. 7 is a cross-sectional view of a socket according to a modification.

FIG. 7 is a cross-sectional view of the socket S according to a modification, to intersect the axial direction of the socket S.

As illustrated in FIG. 7, the socket S according to the modification has a rolling contact surface 7a for the needle bearings 7 on the inner peripheral surface of the outer socket 1. The V-shaped grooves 9 forming the tapered parts 9a are formed on the outer peripheral surface of the inner socket 2.

With the socket S as described above, the needle bearings 7 are wedged between the outer socket 1 and the inner socket 2 by the wedge effect, to make the locked state.

What is claimed is:

1. A socket comprising:
   an outer socket having a substantially cylindrical shape,
   an inner socket having a substantially cylindrical shape and arranged to face an inner periphery of the outer socket;
   an urging member configured to urge the inner socket toward one end of the outer socket; and
   a lock/unlock mechanism configured to allow the inner socket positioned at the one end of the outer socket by the urging member to be rotated in a circumferential direction with respect to the outer socket, and to restrict the inner socket displaced toward the other end of the outer socket against an urging force of the urging member from being rotated in the circumferential direction with respect to the outer socket,
   wherein a connection part to be connected with a rotating tool is formed at either one end in an axial direction of the socket, and a fitting part to be connected with a fastener is formed at the other end.

2. The socket as claimed in claim 1, wherein the fitting part protrudes in the axial direction of the socket with respect to a socket body, in an unlocked state of the inner socket where the lock/unlock mechanism allows the inner socket to be rotated with respect to the outer socket.

3. The socket as claimed in claim 1,
   wherein the lock/unlock mechanism includes an intermediate member having a substantially cylindrical shape arranged between the outer socket and the inner socket, and
   wherein the intermediate member, together with the inner socket, is urged to the one end of the outer socket by the urging member, and, when the intermediate member is displaced toward the other end of the outer socket against the urging force of the urging member, the intermediate member is wedged between the outer socket and the inner socket so that a torque of the rotating tool inputted through the connection part is transmittable between the outer socket and the inner socket.

4. The socket as claimed in claim 3,
   wherein the intermediate member includes a rolling bearing including a plurality of rolling elements and a retainer configured to hold the rolling elements so as to be arranged in a circumferential direction, and
   wherein the rolling elements are wedged by a wedge effect at tapered parts formed by opposing surfaces of the outer socket and the inner socket so that the torque of the rotating tool inputted through the connection part is transmittable between the outer socket and the inner socket.

5. The socket as claimed in claim 4,
   wherein the retainer includes a protrusion to protrude toward the outer socket,
   wherein an inner peripheral surface of the outer socket includes a restriction part configured to engage with the protrusion to restrict the rolling bearing from being moved in a circumferential direction, and
   wherein the restriction part restricts the rolling bearing from being moved in the circumferential direction with respect to the outer socket so that the rolling elements are prohibited from being wedged by the wedge effect at the tapered parts so as to maintain an unlocked state of the inner socket.

6. The socket as claimed in claim 5, wherein the inner peripheral surface of the outer socket includes a circumferential groove in which the protrusion of the retainer is fitted to allow the rolling bearing to be moved in the circumferential direction, and the restriction part formed of a straight groove which extends in the axial direction of the socket to continue to the circumferential groove and which has the protrusion of the retainer fitted therein to restrict the rolling bearing from being moved in the circumferential direction.

7. The socket as claimed in claim 4, wherein the rolling elements are needle bearings, and the tapered parts are formed with V-shaped grooves which are formed to be arranged circumferentially and to extend along a longitudinal length of the socket so as to respectively correspond to the plurality of needle bearings.

* * * * *